United States Patent Office 3,219,611
Patented Nov. 23, 1965

3,219,611
AQUEOUS EMULSIONS OF VINYL AND VINYL AMINE COPOLYMERS
Daniel B. Witwer, Lynn, Mass., assignor to Polyvinyl Chemicals, Inc., Peabody, Mass., a corporation of Massachusetts
No Drawing. Filed Oct. 23, 1961, Ser. No. 147,060
1 Claim. (Cl. 260—29.6)

My invention relates to polymeric resin emulsions, and particularly to aqueous emulsions of copolymers of vinyl and vinyl amine monomers which, when evaporated to dryness, can be dissolved or redispersed in acid solutions but will be resistant to dissolution or redispersion in neutral or alkaline solutions.

The polymeric emulsions of my invention are useful in the manufacture of polishing compositions for producing polished surfaces, such as floor polishes, furniture polishes, automobile polishes, and the like. Such polishes have conventionally comprised aqueous emulsions of waxes or waxy materials, together with various emulsifiers and levelling agents, which, when spread on a desired surface and dried, form a level film having a high gloss. Formerly, it has been proposed to improve the durability and stability of such compositions by replacing some or all of the hard natural waxes conventionally incorporated with various harder materials such as shellac or polymeric resins such as polyethylene, polystyrene and the like. A natural wax emulsion will produce a surface coating that can be completely removed with common detergents. On the other hand, the polymeric emulsions proposed prior to my invention, so far as I am aware, are capable of producing coatings which possess great durability and the necessary resistance to water and wet abrasion, but which are removed, sometimes with difficulty, by common alkaline cleaning agents. As a result, the surface coating produced by polishing compositions incorporating conventional polymeric resin emulsions is unevenly removed by normal cleaning, as with soap and water, because the coating tends to break away in the areas of greatest mechanical stress rather than dissolving or redispersing in the cleaning fluid. That is to say, the resistance to removal by wear of these compositions is not greater than their resistance to removal by common cleaning agents. Thus, polymeric resin emulsions which would provide coatings that had the desired water resistance and resistance to wear, were resistant to alkaline detergents, and yet were readily soluble or redispersible in a commonly available solution, would be highly desirable, and it is the object of my invention to supply the need for such emulsions.

Briefly, the polymeric resin emulsions of my invention consist of aqueous emulsions of copolymers of vinyl and vinyl amine monomers, which are stable, insoluble and non-redispersible in neutral or alkaline solutions, but which are soluble or redispersible in acid solutions. The emulsions of my invention may be prepared by the conventional techniques of emulsion polymerization, as discussed, for example, in Naidus, "Emulsion Polymers for Paints," Industrial and Engineering Chemistry, 45, 4 pp. 712–717 (1953). Specifically, the chosen monomers are polymerized in a water-emulsifier system with the aid of a suitable activator, such as conventional free radical type initiators and conventional redox systems. Preferably, the emulsifier is of the nonionic type, such as an alkylphenoxyethanol or the like, although I have produced acid soluable emulsions by polymerization with anionic, anionic-nonionic, cationic and cationic-nonionic emulsifiers.

The vinyl monomers used in compounding the emulsions of my invention may be any of the aliphatic vinyl esters, such as methyl acrylate, ethyl acrylate, methyl methacrylate, vinyl acetate and the like, and may include an appreciable proportion of other vinyl compounds such as styrene, acrylonitrile, and the like.

The vinyl amine monomer used in making the emulsions of my invention may be selected from the aminesubstituted vinyl compounds, such as 2-vinyl pyridine, dimethylaminoethyl methacrylate, diethylaminoethyl methacrylate, t-butyl aminoethyl methacrylate, acrylates such as diethylaminoethyl acrylate, and the like. The proportion of this constituent determines to a major extent the acid solubility of the resultant emulsion.

My invention will best be understood by consideration of the following detailed examples, which illustrate the mode of carrying it out.

EXAMPLE I

| | Parts by weight |
|---|---|
| Methyl acrylate | 4.65 |
| Methyl methacrylate | 19.88 |
| Dimethylaminoethyl methacrylate | 8.02 |
| Nonionic emulsifier | 9.81 |
| Cumene hydroperoxide | .33 |
| 10 percent by weight aqueous solution of ammonium persulfate | 1.30 |
| 10 percent by weight aqueous solution of ascorbic acid | 1.09 |
| Water | 54.93 |

The nonionic emulsifier used was an octylphenoxy poly (ethyleneoxy)ethanol containing between 30 and 50 oxyethylene units per molecule, hereinafter referred to as octylphenoxyethanol. The water, methyl acrylate, methyl methacrylate, dimethylaminoethyl methacrylate and emulsifier were blended together in a closed vessel provided with a reflux condenser, a thermometer and an agitator, and the temperature was adjusted to 25–30°C. The cumene hydroperoxide was added, followed by the ammonium persulfate and the ascorbic acid, in that order. The temperature rose to 80–90°C., and was held in that range for one half hour by external heating. The reaction product, after being cooled to room temperature, was found to be a stable, opalescent emulsion which was insoluble in water under neutral or alkaline conditions, but soluble in 5 percent acetic acid solutions. When evaporated to dryness, the product was unaffected by aqueous solutions having a pH above 6, but was soluble in aqueous solutions having a pH of 5 or below.

The following examples illustrate variations possible in the formulation of emulsions in accordance with my invention. These emulsions were compounded in the manner illustrated by Example I above, but the resultant emulsions may also be prepared by other known techniques of emulsion polymerization, as described, for example, in "Emulsion Polymers for Paints," cited above. In each instance, the vinyl monomers, typified by the methyl acrylate and methyl methacrylate in Example I, and the amine monomers, typified by the dimethylaminoethyl methacrylate in Example I, are polymerized in water by a redox system, typified by the cumene hydroperoxide, ammonium persulfate and ascorbic acid in Example I, in the presence of a nonionic emulsifier, typified by the octylphenoxyethanol in Example I. The amounts given in the following tabulated examples are in parts by weight.

*Table I*

| Example | MMA | MA | N |
|---|---|---|---|
| 2 | 27.2 | 55.8 | 17 |
| 3 | 50 | 30 | 20 |
| 4 | 55 | 25 | 20 |
| 5 | 60 | 20 | 20 |
| 6 | 65 | 15 | 20 |
| 7 | 62 | 14 | 24 |
| 8 | 62.5 | 17.5 | 20 |
| 9 | 62.5 | 20 | 17.5 |
| 10 | 62.5 | 22.5 | 15 |
| 11 | 62.5 | 17.5 | 20 |
| 12 | 62 | 14.5 | 25 |

The emulsions having the relative monomer proportions illustrated by Table I above were prepared with approximately 10 percent by weight nonionic emulsifier, and a t-butyl hydroperoxide, ammonium persulfate, ascorbic acid redox system. In Table I, MMA is methyl methacrylate, MA is methyl acrylate, and N is dimethylaminoethyl methacrylate. All of the emulsions showed excellent solubility in 5 percent by weight aqueous acetic acid, and illustrate the wide range over which the relative proportions of the constituents can be varied. In general, increasing the amount of methyl methacrylate will tend to increase the hardness of the residue left by evaporating the emulsion to dryness, whereas increasing the methyl acrylate tends to produce a softer residue. Increasing the amine constituent improves the acid solubility, and increasing the ratio of methyl acrylate to methyl methacrylate, to a lesser degree, has the same effect.

The examples tabulated in Table II below illustrate acid soluble emulsions prepared with ethyl acrylate in place of the methyl acrylate used in the examples of Table I.

*Table II*

| Example | MMA | EA | N |
|---|---|---|---|
| 13 | 27.2 | 55.8 | 17 |
| 14 | 36.8 | 46.5 | 17 |
| 15 | 50 | 33 | 17 |
| 16 | 53 | 27 | 20 |
| 17g | 55 | 25 | 20 |
| 18 | 60 | 20 | 20 |
| 19 | 65 | 15 | 20 |

The emulsions of Examples 13–19 were prepared with the same emulsifier and redox system employed in Examples 2–12. In Table II, EA is ethyl acrylate. All of the emulsions were soluble in 5 percent acetic acid.

Table III below illustrates acid soluble emulsions formed from mixtures of ethyl acrylate, methyl acrylate, and methyl methacrylate as the vinyl monomer and dimethylaminoethyl methacrylate as the amine monomer. These emulsions were polymerized in the same manner as Examples 2–19.

*Table III*

| Example | MMA | EA | MA | N |
|---|---|---|---|---|
| 20 | 27.2 | 27.9 | 27.9 | 17 |
| 21 | 27.2 | 14 | 41.8 | 17 |
| 22 | 53 | 13.5 | 13.5 | 20 |
| 23 | 0 | 0 | 83 | 17 |

Table IV below illustrates acid soluble emulsions prepared from mixtures of ethyl and methyl acrylates, with the same amine monomer as Examples 1–23.

*Table IV*

| Example | EA | MA | N |
|---|---|---|---|
| 24 | 54.5 | 14.7 | 30.8 |
| 25 | 59.2 | 15.9 | 24.9 |
| 26 | 66.5 | 16.5 | 17.0 |
| 27 | 66.5 | 25 | 8.5 |
| 28 | 66.5 | 29.2 | 4.3 |

The emulsions of Examples 24, 25 and 26 had good solubility in 5 percent acetic acid, but the solubility of the emulsion of Example 27 was only fair, and that of Example 28 even poorer, illustrating the approach to acid insolubility as the amount of amine monomer is greatly decreased.

Various other vinyl amine monomers can be employed to form acid soluble emulsions without departing from the scope of my invention. Table V below shows the relative proportions of the monomers in a number of acid soluble emulsions incorporating 2-vinyl pyridine as the vinyl amine monomer. In Table V, 2VP is 2-vinyl pyridine.

*Table V*

| Example | MMA | EA | MA | 2VP |
|---|---|---|---|---|
| 29 | 12.3 | 65 | 0 | 22.7 |
| 30 | 8.2 | 69.1 | 0 | 22.7 |
| 31 | 0 | 60.8 | 0 | 39.1 |
| 32 | 0 | 60.7 | 16.4 | 22.9 |

In Examples 29–32 tabulated in Table V above, the emulsifier and redox system employed in Examples 2–28 were used. The emulsions of Examples 29–31 were soluble in hot 10 percent by weight aqueous $H_2SO_4$. The emulsion of Example 32 was soluble in citric acid.

Various combinations of methyl methacrylate, ethyl acrylate, methyl acrylate, and styrene with acrylonitrile, as the vinyl monomers, using 2-vinyl pyridine as the vinyl amine monomer, were also employed to prepare acid soluble emulsions. Examples 33–37, illustrative of such emulsions, are tabulated in Table VI below.

*Table VI*

| Example | MMA | EA | MA | ACN | Styrene | 2VP |
|---|---|---|---|---|---|---|
| 33 | 0 | 45.4 | 16.5 | 15.2 | 0 | 22.8 |
| 34 | 0 | 60.7 | 0 | 16.5 | 0 | 22.8 |
| 35 | 0 | 42 | 0 | 15.2 | 20 | 22.8 |
| 36 | 20 | 42 | 0 | 15.2 | 27.2 | 22.8 |
| 37 | 0 | 34.8 | 0 | 15.2 | 27.2 | 22.8 |

In Table VI, ACN is acrylonitrile. The emulsions of Examples 33–37 were prepared in the same manner as those of Examples 2–32. The emulsions of these examples were soluble with difficulty in aqueous citric acid solutions. The formulation of Example 36 had the best solubility. Examples 34, 35 and 36 were repeated with a nonylphenoxyethanol containing about 30 oxyethylene units per molecule; the citric acid solubility of the formulation of Example 34 was slightly improved, and those of Examples 35 and 36 were slightly reduced, with this nonionic emulsifier.

Other lower vinyl amines may be employed, as illustrated by the following example, in which ethyl acrylate and methyl acrylate were polymerized with t-butyl aminoethyl methacrylate, using octylphenoxyethanol as the emulsifying agent and a cumene hydroperoxide-ascorbic acid redox system.

EXAMPLE 38

| Monomers: | Parts by weight |
|---|---|
| Ethyl acrylate | 51.2 |
| Methyl acrylate | 14.1 |
| t-Butyl aminoethyl methacrylate | 34.7 |

The resultant emulsion was completely soluble in 5 percent aqueous acetic acid.

While non-ionic emulsifiers are preferred for use in formulating the emulsion of my invention, I have found that cationic emulsifiers, mixtures of cationic and non-ionic emulsifiers, anionic emulsifiers and mixtures of anionic and nonionic emulsifiers may also be employed. The following example illustrates an acid soluble emulsion prepared using a mixture of equal parts by weight of tallow, 1, 3 propylene diamine, a cationic emulsifier, and octylphenoxyethanol, a nonionic emulsifier:

EXAMPLE 39

| Composition: | Parts by weight |
|---|---|
| Methyl acrylate | 14 |
| Methyl methacrylate | 62 |
| Dimethylaminoethyl methacrylate | 24 |
| Emulsifier mixture | 18 |

The following example illustrates the use of anionic-nonionic combinations of emulsifiers to produce acid-soluble polymer emulsions; the ingredients listed were polymerized with a mixture of twenty percent by weight sodium lauryl sulfate, an anionic emulsifier, and eighty percent by weight octylphenoxyethanol:

EXAMPLE 40

| Composition: | Parts by weight |
|---|---|
| Methyl acrylate | 14 |
| Methyl methacrylate | 62 |
| Dimethylaminoethyl methacrylate | 24 |
| Emulsifier mixture | 6 |

While I have described various examples of the emulsions of my invention in detail, many changes and variations will be apparent to those skilled in the art upon reading my description, and such can obviously be made without departing from the scope of my invention.

Having thus described my invention, what I claim is:

An emulsion of copolymeric resin particles dispersed in water, said particles being an emulsion copolymer of a first polymerizable material selected from the class consisting of methyl acrylate, ethyl acrylate, acrylonitrile, mixtures of methyl and ethyl acrylate, mixtures of methyl acrylate and methyl methacrylate, mixtures of ethyl acrylate and methyl methacrylate, mixtures of methyl acrylate, ethyl acrylate and methyl methacrylate, the proportion of methyl methacrylate in said mixtures being less than about 82 percent by weight of total mixture, and mixtures of ethyl acrylate and styrene, the proportion of styrene being less than about 36 percent by weight of the total weight of ethyl acrylate and styrene, and a polymerizable second material selected from the class consisting of diethylaminoethyl methacrylate, dimethylaminoethyl methacrylate, 2-vinyl pyridine, and t-butyl aminoethyl methacrylate, the proportion of said second material being less than about 40 percent by weight of the total weight of materials, and said second material being present in an amount sufficient to render said copolymer redispersible in acid solution but not redispersible in neutral or alkaline solution.

References Cited by the Examiner
UNITED STATES PATENTS

| 2,122,418 | 7/1938 | Gladding et al. | 260—29.6 |
| 2,138,762 | 11/1938 | Harmon | 260—29.6 |
| 2,138,763 | 11/1938 | Graves | 260—86.1 |
| 2,728,751 | 12/1955 | Catlin et al. | 260—86.1 |
| 2,862,902 | 12/1958 | Pritchard | 260—86.1 |

SAMUEL H. BLECH, *Primary Examiner.*

LEON J. BERCOVITZ, MURRAY TILLMAN,
*Examiners.*

Notice of Adverse Decision in Interference

In Interference No. 97,966 involving Patent No. 3,219,611, D. B. Witwer, AQUEOUS EMULSION OF VINYL AND VINYL AMINE COPOLYMERS, final judgment adverse to the patentee was rendered Nov. 6, 1974, as to the claim.

[*Official Gazette February 18, 1975.*]